United States Patent [19]

Hirashima et al.

[11] Patent Number: 5,684,074
[45] Date of Patent: Nov. 4, 1997

[54] FLUORINE-CONTAINING COATING COMPOSITION

[75] Inventors: Yoshi Hirashima; Kazuhiko Maeda; Kentaro Tsutsumi, all of Kawagoe, Japan

[73] Assignee: Central Glass Company, Limited, Yamaguchi, Japan

[21] Appl. No.: 548,062

[22] Filed: Oct. 25, 1995

[30] Foreign Application Priority Data

Oct. 25, 1994 [JP] Japan .................. 6-260407
Dec. 5, 1994 [JP] Japan .................. 6-300964

[51] Int. Cl.$^6$ ........................................ C08K 5/54
[52] U.S. Cl. ............... 524/265; 524/269; 524/376; 524/377; 524/378; 525/342
[58] Field of Search ........................ 525/342, 384, 525/385; 524/265, 269, 376, 377, 378

[56] References Cited

U.S. PATENT DOCUMENTS 4,345,057  8/1982  Yamabe et al. .............. 526/247
4,480,072  10/1984  Mallon ............................ 525/61
4,613,641  9/1986  Haubennestal et al. ........ 524/267
4,631,326  12/1986  Koishi et al. ................... 528/249

FOREIGN PATENT DOCUMENTS 57-34107  8/1980  Japan .
6-248237  2/1993  Japan .

Primary Examiner—Ralph H. Dean
Attorney, Agent, or Firm—Keck, Mahin & Cate

[57] ABSTRACT

The invention provides a novel coating composition comprising a first component (i.e. 100 parts by weight of a fluorine-containing copolymer), a second component (i.e. 0.1–20 parts by weight of an alkyl silicate), and a third component (i.e. 0.05–3 parts by weight of a water-soluble polyether-modified silicone oil and/or 1–25 parts by weight of a polyoxytetramethylene glycol). The fluorine-containing copolymer has a hydroxyl value of 80–200 mg KOH per 1g thereof and is prepared by copolymerizing 40–65 mol % of a fluoroolefin, 14–50 mol1% of a copolymerizable vinyl-containing compound, 12–25 mol % of a polymerizable hydroxyl-containing compound, and 0.1–12 mol % of at least one other copolymerizable compound. A cured coated film prepared from the coating composition is superior in elasticity and weathering and stain resistances.

29 Claims, No Drawings

FLUORINE-CONTAINING COATING COMPOSITION

BACKGROUND OF THE INVENTION

The present invention relates to a fluorine-containing coating composition as a paint vehicle, which is capable of providing a coated film superior in stain resistance.

Fluororesins are generally excellent in chemical resistance, weather resistance and heat resistance, and in view of these favorable properties the use of fluororesin based paints is increasing in various fields.

As a fluororesin suitable for solvent-thinned paints, U.S. Pat. No. 4,631,326 discloses a fluorine-containing copolymer comprising chlorotrifluoroethylene, a vinyl or isopropenyl ester of fatty acid and a hydroxyl-containing allyl ether. This allyl ether provides a functional group to the copolymer for curing the copolymer. Japanese Patent Unexamined First Publication No. 57-34107 discloses a fluorine-containing copolymer which is curable a room temperature and comprises a fluoroolefin, cyclohexylvinyl ether, an alkylvinyl ether, and an hydroxyalkyvinyl ether. This hydroxylalkylvinyl ether provides a functional group to the copolymer for curing the copolymer.

Fluororesin-containing solvent-thinned paints are widely used as weather resistant paints in the fields of architecture, automobile and chemical engineering. Furthermore, in view of the environmental protection, fluororesin-containing water-based paints and fluororesin-containing powder paints have been developed, too. Each fluororesin for these paints comprises a fluorocarbon as a main component, such as chlorotrifluoroethylene, tetrafluoroethylene or vinylidene fluoride, and a copolymerizing hydrocarbon monomer such as vinyl ester or vinyl ether, which is added for the purpose of increasing solubility of the fluororesin. The above-mentioned fluororosin-containing solvent-thinned paints are superior in weather resistance, but have a problem in stain resistance. In order to solve this problem, there have been proposals such as that the surface hardness is increased by increasing glass transition point of the fluororesin and that the soil releasability is increased by forming the coated film which is hydrophilic and oil-repellent in water (see Gekkan Kenchiku Shiage Gijutsu, Vol. 19, No. 219, p. 74 (1993)). The fluororesin-containing paints which are thus increased in the surface hardness show good results in a carbon black adhesion test and in a stain resistance test with Magic Marker (a trade name). However, these fluororesin-containing paints are not so improved in stain resistance in an outdoor Furthermore, Japanese Patent Unexamined First Publication 6-248237 discloses a coating composition comprising a first component (100 parts by weight of a synthetic resin), a second component (5–70 parts by weight of an alkyl silicate or its partial hydrolysis condensate), and a third component (a curing catalyst). The second component is added for increasing hydrophilicity of the coated film surface. However, the alkyl silicate in the coated film undergoes a continuous condensation, with the lapse of time. With this, the coated film may become hard and inferior in elasticity.

SUMMARY OF THE INVENTION

It is therefore an object of the present invention to provide a fluorine-containing coating composition as a paint vehicle, which is capable of providing a coated film superior in weathering and stain resistances even after a long-term outdoor weathering test.

It is another object of the present invention to provide a fluorine-containing coating composition as a paint vehicle, which is capable of providing a coated film having a desirable elasticity and desirable weathering and stain resistances.

According to a first aspect of the present invention, there is provided a fluorine-containing coating composition comprising:
- 100 parts by weight of a fluorine-containing copolymer having a hydroxyl value of 80–200 mg KOH per 1 g thereof, said fluorine-containing copolymer being prepared by copolymerizing 40–65 mol % of a fluoroolefin, 4–50 mol % of a copolymerizable vinyl-containing compound, 12–25 mol % of a polymerizable hydroxyl-containing compound, and 0.1–12 mol % of at least one other copolymerizable compound;
- 0.1–20 parts by weight of an alkyl silicate; and
- 0.05–3 parts by weight of a water-soluble polyether-modified silicone oil having in the molecule at least one dimethylsiloxane structural unit and at least one ethylene oxide structural unit.

According to a second aspect of the present invention, there is provided a fluoride-containing coating composition comprising:
- 100 parts by weight of a fluorine-containing copolymer having a hydroxyl value of 80–200 mg KOH per 1 g thereof, said fluorine-containing copolymer being prepared by copolymerizing 40–65 mol % of a fluoroolefin, 14–50 mol % of a copolymerizable vinyl-containing compound, 12–25 mol % of a copolymerizable hydroxyl-containing compound, and 0.1–12 mol % of at least one other copolymerizable compound;
- 0.1–20 parts by weight of an alkyl silicate; and
- 1–25 parts by weight of a polyoxytetramethylene glycol (PTMG) having a number average molecular weight of 160–4,000.

According to a third aspect of the present invention, there is provided a fluorine-containing coating composition comprising:
- 100 parts by weight of a fluorine-containing copolymer having a hydroxyl value of 80–200 mg KOH per 1 g thereof, said fluorine-containing copolymer being prepared by copolymerizing 40–65 mol % of a fluoroolefin, 14–50 mol % of a copolymerizable vinyl-containing compound, 12–25 mol % of a polymerizable hydroxyl-containing compound, and 0.1–12 mol % of at least one other copolymerizable compound;
- 0.1–20 parts by weight of an alkyl silicate;
- 0.05–3 parts by weight of a water-soluble polyether-modified silicone oil having in the molecule at least one dimethylsiloxane structural unit and at least one ethylene oxide structural unit; and
- 1–25 parts by weight of a polyoxytetramethylene glycol having a number average molecular weight of 160–4,000.

The inventors have unexpectedly found that the coating composition according to the first aspect of the present invention, which comprises the specific fluorine-containing copolymer having the specific high hydroxyl-value, the alkyl silicate, and the specific silicone oil, is capable of providing a coated film superior in weathering and stain resistances. Furthermore, the inventors have unexpectedly found that the coating composition according to the second or third aspect of the present invention, which comprises a first component (i.e. the specific fluorine-containing copolymer having the specific high hydroxyl-value), a second component (i.e. the alkyl silicate), and a third component (i.e. the specific PTMG (the second aspect of the present invention) or a mixture of the specific silicone oil and the specific PTMG (the third aspect of the present )) is capable of providing a coated film having a desirable elasticity and desirable weathering and stain resistances

DESCRIPTIONS OF THE PREFERRED EMBODIMENTS

A fluorine-containing coating composition of the present invention will be described in the following.

The fluorine-containing coating composition comprises: a first component (i.e. 100 parts by weight of a fluorine-containing copolymer), a second component (i.e. 0.1–20 parts by weight of an alkyl silicate); and a third component (i.e. 0.05–3 parts by weight of s water-soluble polyether-modified silicone oil and/or 1–25 parts by weight of a polyoxyteramethylene glycol (PTMG)). In other words, the third component of the coating composition is one selected from the group consisting of 0.05–3 parts by weight of the silicone oil, 1–25 parts by weight of PTMG, and a mixture of 0.05–3 parts by weight of the silicone oil and 1–25 parts by weight of PTMG.

The first component has a hydroxyl value of 80–200 mg KOH per 1 g thereof and is prepared by copolymerizing 40–65 mol % of a fluoroolefin, 14–50 mol % of a copolymerizable vinyl-con,siting compound, 12–25 mol % of a polymerizable hydroxyl-containing compound, and 0.1–12 mol % of at least one other copolymerizable compound. The amount of each of these monomers expressed by mol % for preparing the copolymer is based on the total number of moles of all the monomers.

If the amount of fluoroolefin is less than 40 mol % the coated film inferior in weathering resistance. If the of fluoroolefin is more than 65 mol % solubility of the coating composition in a solvent becomes undesirably low.

If the amount of the copolymerizably vinyl-containing compound of the first component is less than 14 mol %, solubility of the coating composition in a solvent may become too low. If it is more than 50 mol %, the coated film may become inferior in weathering resistance. The copolymerizable vinyl-containing compound is not limited to a particular compound. Preferable examples of this vinyl-containing compound are vinyl esters, vinyl ethers, and allyl ethers. Of vinyl esters, polymerizable ester compounds each having carbonyl group in the molecule can be used. Examples of these ester compounds suited to the present invention are vinyl acetate, vinyl propionate, vinyl lactate, vinyl pivalate, vinyl caproate, vinyl caprylate, vinyl laurate, vinyl myristate, vinyl palmitate, vinyl stearate, neononanoic acid ethenyl ester, neodecanoic acid ethenyl ester, and vinyl benzoate. As commercial products of neononanoic acid ethenyl ester and neodecanoic acid ethenyl ester, VEOVA-9 (V-9) and VEOVA-10 (V-10) made by Showa-Shell Chem. Co. can be cited, respectively. Examples of vinyl ethers suited to the present invention are methyl vinyl ether, ethyl vinyl ether, butyl vinyl ether, and cyclohexyl vinyl ether. Examples of allyl ethers suited to the present invention are ethylallyl ether, butylallyl ether, benzylallyl ether, allylglycidyl ether, and cyclohexylallyl ether. Furthermore, (meta) acrylic ester compounds and vinylsilane compounds can be used as the vinyl-containing compounds.

Preferable examples of the polymerizable hydroxyl-containing compound of the first component are hydroxyl-containing allylethers, hydroxyl-containing vinyl ethers and crotonic-acid modified compounds. Examples of hydroxyl-containing allylethers suitable to the present invention are alkylene glycol monoallyl ethers such as ethylene glycol monoallyl ether, propylene glycol monoallyl ether, diethylene glycol monoallyl ether, polyethylene glycol monoallyl ether, and hydroxybutyl allyl ether. Examples of hydroxyl-containing vinyl ethers suitable to the present invention are hydroxyalkyl vinyl ethers such as hydroxymethyl vinyl ether, hydroxyethyl vinyl ether, hydroxybutyl vinyl ether, hydroxypentyl vinyl ethyl and hydroxyhexyl vinyl ether, and polyethylene glycol monovinyl ethers such as diethylene glycol monovinyl ether. An example of crotonic-acid modified compounds suitable to the present invention is ethylcrotonic acid. Of examples of the polymerizable hydroxyl-containing compound, glycerol monoallyl ether and ε-caprolactone-modified glycerol monoallyl ether are preferably used in the present invention. Each of these two compounds has two hydroxyl groups in the molecule. Due to this characteristic, the coated film immediately after the application of the paint will have a desirable low contact angle of water drop thereon. Furthermore, glycerol monoallyl ether has a secondary hydroxyl (i.e. a hydroxyl bonded no a secondary carbon atom in the molecule), which is hardly involved in the crosslinking. Due to this characteristic, the coated film will maintain a desirable low contact angle of water drop thereon for a longer time. It is preferable that the fluorine-containing copolymer has a hydroxyl value caused by only the secondary hydroxyl, within a range from 1 to 60 mg KOH per 1 g of the fluorine-containing copolymer. If this hydroxyl value exceeds 60 mg KOH/g, the coated film may absorb too much amount of water and thus may become inferior in weathering resistance.

In the invention, the fluorine-containing copolymer has a total hydroxyl value of 80–200 mg KOH per 1 g thereof. If it is less than 80 mg KOH/g, stains may easily penetrate into the coated film. If it is more than 200 mg KOH/g, solubility of the coating composition in a solvent becomes undesirably low, and the coated film becomes inferior in weathering resistance.

The at least one other compound for preparing the fluorine-containing copolymer is not limited to a particular compound, as long as it is polymerizable. Preferable of this compound are carboxyl-containing compounds and vinyl alkoxysilanes. The carboxyl-containing compounds are not limited to particular compounds, as long as each of them has a carboxyl group and a polymerizable double bond in the molecule. Preferable examples of the carboxyl-containing compounds are vinylacetic acid, decanoic acid, undecylenic acid, and crotonic acid. The carboxyl-containing compound is effective for improving, for example, pigment dispersibility in the paint and pot life of the paint. The amount of the carboxyl-containing compound is preferably within a range from 0,1 to 3 mol %. If it is less than 0.1 mol %, the effects of the addition of she carboxyl-containing compound may become insufficient. If it is more than 3 mol %, pot life of the paint may become too short.

A vinyl alkoxysilane as the at least one other compound for preparing the fluorine-containing copolymer is used in the present invention for raising the crosslinking density of the coated film and for improving compatibility between the fluorine-containing copolymer and the alkyl silicate. It is preferable that this vinyl alkoxysilane has an alkoxyl group having a carbon atom number from about 1 to about 8. Preferable examples of this alkoxyl group are methoxy group, ethoxy group, isopropoxy group and n-butoxy group. The vinyl alkoxysilane may have only one type of or different types of alkoxyl group (residue) in the molecule. A preferable example of the vinyl alkoxysilane is a vinyl trialkoxysilane such as vinyl trimethoxysilane, vinyl triethoxysilane, vinyl triisopropoxysilane, vinyl tri-n-butoxysilane, vinyl dimethoxyethoxysilane, or vinyl methoxydiethoxysilane. Hydroxyl group produced by hydrolysis of alkoxyl group of the vinyl alkoxysilane, together with the alkyl silicate, will produce the Si—O—Si bridge. Furthermore, this hydroxyl group will react with a hardener such as an isocyanate compound or a melamine compound, to harden the coated film. This hydroxyl group will improve compatibility between the alkyl silicate and the fluorine-containing copolymer, in the preparation of the hardened coated film. The amount of the vinyl alkoxysilane is preferably within a range from 0.1 to 2 mol %. If it is less than 0.1 mol %, the advantageous effect on the crosslinking density may become insufficient. If it is more than 12 mol %, the varnish dissolving therein the coating composition of the present invention may become unstable and the coated film may become inferior in weathering resistance.

The fluorine-containing copolymer is obtained by copolymerizing the essential four kinds of monomers together, in the presence of a commonly used radical polymerization initiator. The manner of the copolymerization reaction is not particularly limited. For example the object is accomplished by solution polymerization, suspension polymerization, or emulsion polymerization. The temperature of the copolymerization reaction varies according to the type of the radical polymerization initiator, but usually is within a range from 0° to 130° C.

Examples of a solvent for the copolymerization reaction are water, alcohols such as tertiary butanol and ethyl alcohol, saturated hydrocarbons such as n-hexane and n-heptane, aromatic hydrocarbons such as toluene and xylene, fluorocarbons such as trichlorotrifluoroethane and dichlorotetrafluoroethane; ketones such as acetone, methyl ethyl kenone and methyl isobutyl ketone, and esters such as ethyl acetate and butyl acetate. Only one kind of the solvent or a mixture of at least two kinds of the solvent may be used for the copolymerization reaction.

Examples of the radical polymerization initiator are dicarbonates such as diisopropyl peroxydicarbonate, di-n-propyl peroxydicarbonate and di-2-ethylhexyl peroxy-dicarbonate, diacyl peroxides such as n-heptafluorobutyric peroxide, lauroyl peroxypivalate and t-butyl oxyneodecanoate, alkyl peroxides such as di-t-butyl peroxide and t-butylcumyl peroxide, and peroxy esters such as t-butyl peroxypivalate and t-butyl peroxyneodecanoate.

The fluorine-containing copolymer is not particularly limited in its molecular weight. However, depending on the required coated film's strength and elasticity, its number average molecular weight varies preferably within a range from 1,000 to 30,000 (polystyrene as a standard material) and more preferably within a range from about 3,000 to about 18,000. If it is lower than 1,000, the coated film my become inferior in weathering resistance and elasticity. If it is higher than 30,000, the solution may become too viscous, With this, it becomes difficult to handle the solution.

The above-mentioned alkyl silicate as the second component of the coating composition of the present invention is a tetraalkoxysilane or its condensate which is represented by the general formula (1):

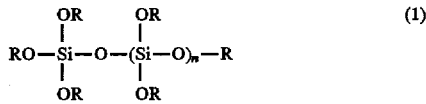

where R represents an alkyl group having a carbon atom number from 1 to 8, and n is an integer from 0 to 11.

Examples of the alkyl silicate are tetramethoxysilane, tetraethoxysilane, tetraisopropoxy-silane, tetra-n-propoxysilane, tetra-n-butoxysilane, tetra-2-methoxyethoxysilane, tetra-2-ethylhexyloxysilane, and partial hydrolysates of these compounds. The precise structure of the partial hydrolysates is not known. However, the partial hydrolysates are polysilicates (esters) having a framework of Si—O bonds and alkoxyl groups. The framework of the general formula (1) is shown as being straight-chain. However, the alkyl silicate may have a branched structure or a cyclic structure. The method for preparing the alkyl silicate is not particularly limited. For example, tetraalkoxysilane is mixed with water, an acid, and/or a solvent, thereby to partially hydrolyze this tetraalkoxysilane and then to condense the partial hydrolysate. Various commercial alkyl silicates (condensates), which are different in condensation degree, structure, and the type of alkoxyl group, are available. Examples of the commercial alkyl silicates are M SILICATE 51, ETHYLSILICATE 40, and ETHYLSILICATE 45, all of which are products of TAMA CHEMICAL INDUSTRY CO., and ETHYLSILICATE 40, which is a product of COLCOAT CO. These alkyl silicates have an effective silica component concentration within a range from about 28 to about 52 wt %. Further examples of the Commercial products are HAS-1, HAS-6, and HAS-10, which contain the alkyl silicates dissolved in ethanol or isopropanol and are products of COLCOAT CO. Furthermore, it is possible to prepare an alkyl silicate having a silica component concentration of 57 wt %, by further hydrolyzing the commercial alkyl silicate and thus by increasing the silica component concentration thereof. Due to the addition of the alkyl silicate to the fluorine-containing copolymer, the coated film is lowered in contact angle of water drop thereon. In particular, when the above-mentioned vinyltrialkoxysilane is used as the at least one other compound for preparing the fluorine-containing copolymer, contact angle of water drop on the coated film is greatly lowered. This phenomenon is considered to be caused by the synergism between the addition of the vinyltrialkoxysilane and that of the alkyl silicate. With this, the outer wall of a building or the like will hardly have thereon undesirable streaks caused by rain for a long time.

It is necessary that the amount of the alkyl silicate is within a range from 0.1 to 20 parts by weight. If it is less than 0.1 parts by weight, the advantageous effect of the addition of alkyl silicate on the coated film (i.e., the reduction of the contact angle of water drop on the coated film) becomes insufficient. If it is more than 20 parts by weight, the contact angle of water drop on the coated film changes by acid rain and/or heat as time passes. Thus, the outer wall of a building or the like becomes easily stained over a long period of time.

The above-mentioned water-soluble silicone oil of the third component has in the molecule at least one dimethylsiloxane structural unit and at least one ethylene oxide structural unit. This silicone oil is optionally used in the present invention for the purpose of decreasing contact angle of water drop on the coated immediately after the application of the paint. For this purpose, the silicone oil is water-soluble and has in the molecule at least one dimethylsiloxane structural unit and at least one ethylene oxide structural unit. The degree of polymerization of the silicone oil is not particularly limited as long as it is water soluble. The silicone oil has a viscosity at 25° C. preferably within a range from about 20 to about 10,000 cP and more preferably within a range from about 50 to about 3,000 cP. If the silicone oil is not used, the contact angle immediately after the application of the paint becomes relatively high with this, the outer wall of a building or the like may have streaks of rain, immediately after the exposure of the coated film to the air. The silicone oil is a polydimethylsiloxane having at least one polyalkylene oxide structure which has been introduced into one terminal, both terminals, or a side chain of the polydimethylsiloxane. The polyalkylene oxide structure has at least one ethylene oxide structural unit as an essential unit and may optionally have one or two kinds of oxyalkylene structural unit having a carbon atom number from 3 to 8. In case that the silicone oil has at least two kinds of alkylene oxide structural unit, each unit may be introduced into the silicone oil by random copolymerization or block copolymerization, The end group of the polyalkylene oxide which has been introduced into a terminal or a side chain of the polydimethylsiloxane is not particularly limited. One of preferable examples of the end group is a functional group (e.g., hydroxyl) which is no be involved in the curing reaction.

The polyether-modified silicone oil suitable to the present invention is not particularly limited as long as the above-mentioned conditions are satisfied. Preferable examples of the silicone oil are represented by the following general formulas (2) and (3):

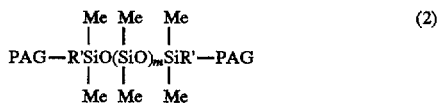

where PAG represents at least one polyalkylene oxide chain having at least one ethylene oxide structural unit, R' represents an alkylene group, Me represents a methyl group, and m is an integer,

where an arbitrary number of not less than one of the methyl groups may be replaced by -R'-PAG, and Me, m, PAG and R' are respectively defined as above.

Examples of the nonlimitative commercial products of the polyether-modified silicone oil are SF8427, BY16-005, BY16-006, BY6-007 and BY16-008, all of which are represented by the general formula (2), and 8H3746, SF8428, SH3771, BY16-036, BY16-027, BY16-038, SH8400, SH3749, SH3748 and SF8410, all of which are represented by the general formula (3). All of these examples are trade names of Toray-Dow Corning. Silicone Co. It is needless to say that other commercial products of another company equivalent to the above-mentioned commercial products may be used in the present invention. For example, it is possible to use BYK333 which is a trade name of polyether-modified silicone oil made by BYK CHEMIE Co.

When the polyether-modified silicone oil alone or together with the polyoxytetramethylene glycol is used as the third component of the coating composition of the present invention, it is preferable that the amount of the silicone oil is within a range from 0.05 to 3 parts by weight. If it is less than 0.05 parts by weight, the effect of the addition of the silicone oil on the reduction in the contact of water drop on the coated film may become insufficient. If it is more than 3 parts by weight, the coated film my be lowered in weathering resistance. When the coating composition of the present invention comprises 100 parts by weight of the fluorine-containing copolymer, 0.1–20 parts by weight of the alkyl silicate, and 0.05–3 parts by weight of the polyether-modified silicone oil, the coated film becomes superior in stain resistance for a long period of time, from a time immediately after the application of the paint.

The above-mentioned polyoxytetramethylene glycol is used in the present invention for the purpose of providing the Si-o-si structure of the alkyl silicate, which is hard and brittle, with elasticity and flexibility. For this purpose, it is preferable that this glycol has a number average molecular weight of 160–4,000. If it is less than 160, the coated film may become insufficient in elasticity and flexibility. If it is more than 4,000, this glycol may not be uniformly dissolved in the paint. With this, the coated film may locally have cracks and thus have stains thereon. By the addition of this glycol, the coated film becomes resistant to bending and vibration and superior in durability and adhesion to a substrate.

When the polyoxytetramethylene glycol alone or together with the polyether-modified silicone oil is used as the third component of the coating composition of the present invention, the amount of this glycol is preferably within a range from 1 to 25 parts by weight. If it is less than 1 part by weight, the coated film may become brittle and thus have cracks. If it is more than 25 parts by weight, the curing rate of the coated film may become too slow and thus have stains thereon.

When the coating composition of the present invention comprises 100 parts by weight of the fluorine-containing copolymer, 0.1–20 (preferably 1–15) parts by weight of the alkyl silicate, and 1–25 parts by weight of the polyoxytetramethylene glycol, the coated film becomes superior in stain resistance for a long period of time, from a time immediately after the application of the paint.

To prepare a solution comprising the coating composition of the present invention, a variety of organic solvents are of use. Examples are aromatic hydrocarbons, esters, ethers, ketones and alcohols. The solvent may be one solvent alone or a mixture of solvents. It is optional to add a pigment or a dye to the solution. Furthermore, it is optional to add other additives to the paint, such as an ultraviolet absorbing agent, a light stabilizer, a rust preventive agent, and a dispersion stabilizing agent.

Various curing agents (hardener) are of use in the present invention, for the purpose of conducting a curing reaction of the coating composition of the present invention with the curing agent. Examples are polyisocyanate-type curing agents, which are used for a two-package-type urethane-resin paint, melamine-type curing agents, and blocked-isocyanate-type curing agents. For example, when an isocyanate-type curing agent is used, it is preferable that the molar ratio of NCO to OH (NCO/OH) is within a range from 0.3 to 1.0. particular, in case that the fluorine-containing copolymer has a hydroxyl value within a range from 100 to 200 mg KOH/g, it is preferable that the molar ratio of NCO (isocyanato) to OH (hydroxyl) is within a range from 0.4 to 1.0. It is optional to add a metal salt(s) of Carboxylic acid such as alkyl titanate, tin octylate, and dibutyl tin laurate; an amine salt such as dibutylamine-2-hexoate; an acid catalyst; and a basic catalyst.

The following examples are illustrative of the present invention, but these examples are not limitative. In the following, the amount of each monomer expressed by mol % for preparing the copolymer is based on the total number of moles of all the monomers.

EXAMPLE 1

In this example, firstly, a first varnish containing a fluorine-containing copolymer according to the present invention was prepared as follows.

At first, a 2-liter stainless steel autoclave provided with an electromagnetic stirrer was charged with 111.9 g (20 mol %) of vinyl acetate (VAc), 119.8 g (10 mol %) of neononanoic acid ethenyl ester (V-9), 125.2 g (14.8 mol %) of hydroxybutyl allyl ether (HBAE), 43.0 g (5 mol %) of glycerol monoallyl ether (GMAE), 2.4 g (0.2 mol %) of undecylenic acid (UA), 240 g of xylene, and 13 g of t-butylperoxy pivalate made by Nippon Oil & Fats Co. The gas atmosphere in the autoclave was replaced by nitrogen gas, and this operation was repeated three times. Then, 439 g (58 mol %) of chlorotrifluoroethylene (CTFE) was introduced into the autoclave. The temperature in the autoclave was gradually raised up to 55° C., and at this temperature polymerization reaction was carried out for 20 hr in the presence of 1.4 g of sodium carbonate. The reaction liquid was taken out of the autoclave. The reaction liquid was filtered to obtain a fluorine-containing copolymer solution. Then, xylene was added to the solution to prepare the first varnish in a manner to adjust the concentration of this copolymer in the first varnish to 60 wt %. The chemical composition and analytical results of the copolymer (Copolymer A) are shown in Table 1. The molecular weight (Mn) shown in Table 1 is the number average molecular weight (polystyrene as a standard material) determined by GPC.

Then, a white paint was prepared as follows using the above-mentioned first varnish containing the fluorine-containing copolymer. At first, SF8427 (i.e., trade name of polyether-modified silicone oil made by Toray Dow Corning. Silicone Co.) was added to the first varnish in a ratio of the silicone. oil co the copolymer by parts by weight of 1.1:100, thereby to prepare a second varnish. Then, titanium oxide in the form of powder was uniformly mixed with the second varnish in a ratio of the titanium oxide to the fluorine-containing copolymer by parts by weight of 100:100, using a dispersion mill. Then, M SILICATE 51 (i.e., trade name of a partially hydrolyzed alkyl silicate made by Tama Chemical Industry Co.) was added to this mixture in a ratio of the alkyl silicate to the fluorine-containing copolymer by parts by weight of 10:100. Then, a xylene solution Of CORONATE HX (i.e., trade name of a curing agent made by Nippon Polyurethane Industry co.) containing xylene and this curing agent in a molar ratio of 1:1 was added to the mixture so as to adjust the molar ratio of NCO to OH to 1.0. Thon, the mixture was uniformly stirred to prepare the white paint.

EXAMPLES 2–6

In these examples, Example 1 was repeated except that selective changes were made as shown in Table 1 in the kind and guantity of monomers for preparing the fluorine-containing copolymers and that selective changes were made as shown in Table 2 in the kind and quantity of components for preparing the paints. In fact, as is seen from Tables 1 and 2, Copolymer B was used in Examples 2, 3 and 6, Copolymer C was used in Example 4, and Copolymer D was used in Example 5, for the purpose of preparing the paints.

Comparative Examples 1–6

In these comparative examples, Example 1 was repeated except that selective changes were made as shown in Table 1 in the kind and quantity of monomers for preparing the fluorine-containing copolymers and that selective changes were made as shown in Table 2 in the kind and quantity of components for preparing the paints.

In fact, as is seen from Tables 1 and 2, Copolymer B was used in Comparative Examples 3 and 5, Copolymer C was used in Comparative Example 4, Copolymer D was used in Comparative Example 6, Copolymer E was used in Comparative Example 1, and Copolymer F was used in Comparative Example 2, for the purpose of preparing the paints.

As is seen from Table 1, Copolymer E of Comparative Example 1 had a hydroxyl value of 78, which is lower than the essential range (80–200) of the present invention. copolymer F of Comparative Example 2 had an amount of vinyltrimethoxysilane (the at least one other copolymerizable compound of the present invention) of 15 mol %, which is higher than the essential range (0.1–12 mol %) of the present invention.

As is seen from Table 2, in Comparative Example 3, the polyether-modified silicone oil was omitted. In Comparative Example 4, the alkyl silicate was omitted (see Table 2). In Comparative Example 5, the amount of alkyl silicate was higher than the essential range (0.1–20 parts by weight) of the present invention. In Comparative Example 6, the amount of the polyether-modified silicone oil was higher than the essential range (0.05–3 parts by weight) of the present invention.

TABLE 1

| | Fluorine-containing Copolymers | | | | | |
|---|---|---|---|---|---|---|
| | A | B | C | D | E | F |
| Charged Monomers (mol %) | | | | | | |
| CTFE | 50 | 58 | 50 | 40 | 50 | 50 |
| VAc | 20 | 8 | 20 | 10 | 19 | 8 |
| V-9 | 10 | 11.8 | — | 10 | 10 | 12 |
| HBAE | 14.8 | 18 | 14.8 | 16.8 | 10.8 | 10 |
| GMAE[1] | 5 | — | 5 | 5 | — | 4.8 |
| UA | 0.2 | 0.2 | 0.2 | 0.2 | 0.2 | 0.2 |
| TMVS[2] | — | 4 | — | — | — | 15 |
| TEVS[3] | — | — | 10 | 18 | 10 | — |
| OH value (mg KOH/g) | 140 | 90 | 160 | 195 | 78 | 105 |
| Acid Value (mg KOH/g) | 1.1 | 1.2 | 1.0 | 0.9 | 1.2 | 1.0 |
| Molecular Weight (Mn) | 5,300 | 7,000 | 5,600 | 4,500 | 6,800 | 7,100 |

[1]GMAE: glycerol monoallyl ether
[2]TMVS: vinyltrimethoxysilane
[3]TEVS: vinyltriethoxysilane

Evaluation Test

In each of Examples 1–6 and Comparative Examples 1–6, the white paint was sprayed on an aluminum plate to form thereon a coated film having a thickness of about 40 μm. The contact angle of water drop on the coated film was measured immediately after the application of the white paint to the aluminum plate. The result is shown in Table 3.

After the application of the white paint, the coated aluminum plate was allowed to stand still for two days at room temperature to dry and cure the coated film.

The thus prepared sample (i.e., the aluminum plate with the coated film) obtained in each of Examples 1–6 and Comparative Examples 1–6 was subjected to a color difference determination test, short-term and long-term stain resistance tests, and a weathering test. The results are shown in Table 3. In the color difference determination test, the sample color was measured before and after an outdoor exposure test for six months in accordance with Japanese Industrial Standard (JIS) Z8730. In fact, a portion of the sample which has no rain streaks thereon was used for the measurement after the exposure test. This outdoor exposure test was conducted in Kawagoe City, Saitama Prefecture, Japan. The short-term and long-term stain resistance tests were conducted by exposing the samples outdoors for three and six months, respectively. Then, the existence of rain streaks was examined with the naked eye. In Table 3, "A" means that no rain-streak is on the sample; "B" means that rain streaks are on the sample but unobtrusive; "C" means that rain streaks are on the sample but relatively thin in thickness, and "D" means that rain streaks are on the sample and obtrusive. The weathering test was conducted by accelerated testing with a sunshine weather meter for 4,000 hr, and the surface gloss of each sample at 60 degrees was measured before and after the weathering test to indicate the degree of weatherability by percentage of the retained gloss.

In addition to Examples 1–6, each of Examples 1–6 was modified only in respect of the mixing order of the components. In other words, in the modification of each of Examples 1–6, at first, the pigment (the titanium oxide) was added to the first varnish containing the fluorine-containing copolymer. Then, the alkyl silicate, the silicone oil, and the curing agent were added to this mixture, thereby preparing the white paint. Using this white paint the same tests as those in Evaluation Test for Example 1 were conducted. With this, in the modification of each of Examples 1–6, the same results as those of each of Examples 1–6 shown in Table 3 were respectively obtained, in respect of all the characteristics of the coated film.

xylene. The chemical composition and analytical results of the copolymer (Copolymer G) are shown in Table 4. Then, a white paint was prepared as follows using the above-mentioned first varnish containing the fluorine-containing

TABLE 2

|  | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
| --- | --- | --- | --- | --- | --- | --- | --- | --- | --- | --- | --- | --- |
| Copolymers (parts by weight) | | | | | | | | | | | | |
| Copolymer A | 100 | — | — | — | — | — | — | — | — | — | — | — |
| Copolymer B | — | 100 | 100 | — | — | 100 | — | — | 100 | — | 100 | — |
| Copolymer C | — | — | — | 100 | — | — | — | — | — | 100 | — | — |
| Copolymer D | — | — | — | — | 100 | — | — | — | — | — | — | 100 |
| Copolymer E | — | — | — | — | — | — | 100 | — | — | — | — | — |
| Copolymer F | — | — | — | — | — | — | — | 100 | — | — | — | — |
| Alkyl Silicates (parts by weight) | | | | | | | | | | | | |
| M SILICATE 51 | 10.0 | 10.0 | — | — | — | — | — | — | 9.9 | — | — | — |
| ETHYL SILICATE 45 | — | — | 5.2 | — | 18.0 | 6.5 | 5.2 | 5.2 | — | — | 26.8 | — |
| HAS-6 | — | — | — | 10.6 | — | — | — | — | — | — | — | 11.5 |
| Polyether-modified Silicone Oils (parts by weight) | | | | | | | | | | | | |
| SF8427 | 1.1 | 1.1 | — | 0.6 | — | — | — | — | — | 2.0 | 0.6 | — |
| SH3746 | — | — | — | — | — | 1.1 | — | — | — | — | — | — |
| BYK333 | — | — | 0.1 | — | 2.1 | — | 0.1 | 0.1 | — | — | — | 3.7 |
| NCO/OH | 1.0 | 1.0 | 1.0 | 0.7 | 0.6 | 1.0 | 1.0 | 1.0 | 1.0 | 0.6 | 1.0 | 0.5 |

TABLE 3

| Coated Film Characteristics | Ex. 1 | Ex. 2 | Ex. 3 | Ex. 4 | Ex. 5 | Ex. 6 | Com. Ex. 1 | Com. Ex. 2 | Com. Ex. 3 | Com. Ex. 4 | Com. Ex. 5 | Com. Ex. 6 |
| --- | --- | --- | --- | --- | --- | --- | --- | --- | --- | --- | --- | --- |
| Contact Angle (°) | 61 | 58 | 72 | 62 | 60 | 62 | 88 | 80 | 75 | 90 | 67 | 59 |
| Color Diff. (ΔE) | 4.2 | 4.4 | 4.5 | 4.2 | 3.8 | 4.0 | 7.9 | 7.6 | 4.9 | 8.2 | 5.4 | 6.7 |
| Short Term Stain Resistance | B | B | B | A | A | A | D | D | C | D | A | A |
| Long Term Stain Resistance | B | B | B | A | A | B | C | C | B | C | D | D |
| Weatherability (%) | 87 94 | 93 | 92 | 92 | 91 | 93 | 94 | 84 | 89 | 92 | 86 | 87 |

EXAMPLE 7

In this example, Example 1 was slightly modified with respect to the kind and quantity of monomers as shown in Table 4 for preparing the fluorine-containing copolymer and to the kind and quantity of components as shown in Table 5 for preparing the paint.

In this example, firstly, a first varnish containing a fluorine-containing copolymer according to the present invention was prepared as follows.

The same autoclave as that of Example 1 was charged with 44.6 g (8 mol %) of Vinyl acetate (VAc), 46.6 g (10 mol %) of ethyl vinyl ether (EVE), 101.2 g (12 mol %) of hydroxybutyl vinyl ether (MBVE), 42.8 g (5 mol %) of glycerol monoallyl ether, 184.8 g (15 mol %) of vinyltri-ethoxysilane (TEVS), 240 g of xylene, and 13 g of t-butylperoxy pivalate made by Nippon Oil & Fats Co. The gas atmosphere replacement was conducted in the same manner as in Example 1. Then, 339.4 g (45 mol %) of chlorotrifluoroethylene and 32.4 g (5 mol %) of tetrafluoroethylene (TFE) were introduced into the autoclave. The polymerization reaction was carried out in the same manner as in Example 1. The first varnish was prepared from the reaction liquid in the same manner as in Example 1, using copolymer. At first, PTMG-2000 (i.e., trade name of a polyoxytetramethylene glycol which has a number average molecular weight of 2,000 and is made by Sanyo Kasei Kogyo Co.) was added to the first varnish in a ratio of this glycol to the copolymer by parts by weight of 5:100, thereby to prepare a second varnish. Then, the white paint was prepared in the same manner as in Example 1, with the titanium oxide, M SILICATE 51, and the xylene solution of CORONATE HX, which were used in Example 1.

EXAMPLES 8–12

In these examples, Example 7 was repeated except that selective changes were made as shown in Table 4 in the kind and quantity of monomers for preparing the fluorine-containing copolymers and that selective changes were made as shown in Table 5 in the kind and quantity of components for preparing the paints. In fact, as is seen from Tables 5, Copolymers H, I, J, K, and L shown in Table 4 were respectively used in Examples 8–12, for the purpose of preparing the paints. As shown in Table 5, in Examples 8, and 12, PTMG-650 (i.e., trade name of another polyoxytetramethylene glycol which has a number average molecular weight of 650 and is made by Sanyo Kasei Kogyo Co.) was used in place of PTMG-2000.

Comparative Examples 7-13

In these comparative examples, Example 7 was repeated except that selective changes were made as shown in Table 4 in the kind and quantity of monomers for preparing the fluorine-containing copolymers and that selective changes were made as shown in Table 5 in the kind and quantity of components for preparing the paints.

As is seen from Table 4, Copolymer M of Comparative Example 7 had a hydroxyl value of 78, which is lower than the essential range (80–200) of the present invention. Copolymer N of Comparative Example 8 had an amount of vinyltrimethoxysilane (the at least one other copolymerizable compound of the present invention) of 15 mol %, which is higher than the essential range (0.1–12 mol %) of the present invention.

As is seen from Table 5, in each of Comparative Examples 9–10, the polyoxytetramethylene glycol was omitted. In Comparative Example 11, the alkyl silicate was omitted. In Comparative Example 12, the amount of alkyl silicate was higher than the preferable range (1–15 parts by weight.) of the present invention. In Comparative Example 13, the amount of the polyoxytetramethylene glycol was higher than the essential range (1–25 parts by weight) of the present invention.

TABLE 4

| | Fluorine-containing Copolymers | | | | | | | |
|---|---|---|---|---|---|---|---|---|
| | G | H | I | J | K | L | M | N |
| Charged Monomers (mol %) | | | | | | | | |
| CTFE | 45 | 45 | 50 | 58 | 50 | 50 | 50 | 50 |
| TFE | 5 | — | — | — | — | — | — | — |
| HFIB[1] | — | 5 | — | — | — | — | — | — |
| VAc | 8 | 8 | 20 | 8 | 20 | 10 | 19 | 8 |
| V-9 | — | — | 10 | 11.8 | — | 10 | 10 | 12 |
| VPv[2] | — | 10 | — | — | — | — | — | — |
| EVE | 10 | 15 | — | — | — | — | — | — |
| HBAE | — | — | 14.8 | 18 | 15 | 17 | 11 | 10 |
| HBVE | 12 | 8 | — | — | — | — | — | — |
| GMAE | 5 | 4 | 5 | — | 5 | 5 | — | 4.8 |
| UA | — | — | 0.2 | 0.2 | — | — | — | 0.2 |
| TMVS | — | — | — | 4 | — | — | — | 15 |
| TEVS | 15 | 5 | — | — | 10 | 8 | 10 | — |
| OH Value (mg KOH/g) | 150 | 85 | 140 | 90 | 160 | 195 | 78 | 105 |
| Acid value (mg KOH/g) | 0 | 0 | 1.1 | 1.2 | 0 | 0 | 0 | 1.0 |
| Molecular Weight (Mn) | 6500 | 5100 | 5300 | 7000 | 5600 | 4500 | 6800 | 7100 |

[1]HFIB: hexafluoroisobutene
[2]VPv: vinyl pivalate

Evaluation Test

The contact angle of water drop was measured in the same manner as in Evaluation Test for Example 1. The sample (i.e., the aluminum plate with the coated film) obtained in each of Examples 7–12 and Comparative Examples 7–13 was subjected to the same tests as those in Evaluation Test for Example 1, except that T-bending test was additionally conducted. In this bending test, at first, the aluminum plate coated with the coated film was exposed to the air for six months outdoors. Then, this plate having a thickness of 0.8 mm was bent. The existence of cracks and peeling of the coated film was examined with the naked eye. In Table 6, "A" means that the sample showed at least 3T in the bending test. With respect to the samples of not greater than 3T in the bending test, the bending angle at which cracks and/or peeling off of the coated film occurred is shown in Table 6.

In addition to Examples 7–12, each of Examples 7–12 was modified only in respect of the mixing order of the components. In other words, in the modification of each of Examples 7–12, at first, the pigment (the titanium oxide) was added to the first varnish containing the fluorine-containing copolymer. Then, the polyoxytetramethylene glycol, the alkyl silicate, and the curing agent were added to this mixture, thereby preparing the white paint. Using this white paint, the same tests as those in Evaluation Test for Example 7 were conducted. With this, in the modification of each of Examples 7–12, the same results as those of each of Examples 7–12 shown in Table 6 were respectively obtained, in respect of all the characteristics of the coated film.

EXAMPLE 13

In this example, Example 7 was repeated except that selective changes were made in the kind and quantity of components for preparing the paint. In fact, 100 parts by weight of Copolymer G, 5 parts by weight of PTMG-2000, 5 parts by weight of ETHYL SILICATE 45, and 1.1 parts by weight of SF8427 (the polyether-modified silicone oil) were used for preparing the paint. The molar ratio of NCO to OH of the paint was adjusted to 0.7 by adding the xylene solution of CORONATE HX to the paint. In the preparation of the paint, the silicone oil was added at the same time as PTMG-2000.

The sample was subjected to the same tests as those in Evaluation Test for Example 7, the contact angle of water drop immediately after the application of the paint to the aluminum plate was 68 degrees. The color difference was 4.3. The short term stain resistance was "B". The long term stain resistance was "A". The weatherability was 90%. The result of the bending test was "A".

TABLE 5

| | Ex. 7 | Ex. 8 | Ex. 9 | Ex. 10 | Ex. 11 | Ex. 12 | Com. Ex. 7 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|---|---|---|
| Copolymers (parts by weight) | | | | | | | | | | | | | |
| Copolymer G | 100 | — | — | — | — | — | — | — | — | — | — | — | — |
| Copolymer H | — | 100 | — | — | — | — | — | 100 | — | — | — | — | — |
| Copolymer I | — | — | 100 | — | — | — | — | — | 100 | — | — | — | — |
| Copolymer J | — | — | — | 100 | — | — | — | — | — | 100 | — | — | — |
| Copolymer K | — | — | — | — | 100 | — | — | — | — | — | 100 | — | — |

TABLE 5-continued

| | Ex. 7 | Ex. 8 | Ex. 9 | Ex. 10 | Ex. 11 | Ex. 12 | Com. Ex. 7 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|---|---|---|
| Copolymer L | — | — | — | — | — | 100 | — | — | — | — | — | — | 100 |
| Copolymer M | — | — | — | — | — | — | 100 | — | — | — | — | — | — |
| Copolymer N | — | — | — | — | — | — | — | 100 | — | — | — | — | — |
| Polyoxytetra-methylene glycols (parts by weight) | | | | | | | | | | | | | |
| PTMG-650 | — | 5 | 5 | — | — | 10 | — | 5 | — | — | — | — | 30 |
| PTMG-2000 | 5 | — | — | 10 | 15 | — | 10 | — | — | — | 10 | 15 | — |
| Alkyl Silicates | | | | | | | | | | | | | |
| M SILICATE 51 | 10 | — | 8 | — | 8 | — | — | 8 | 8 | — | — | 20 | — |
| ETHYL SILICATE 45 | — | 5 | — | 10 | — | 8 | 10 | — | — | 8 | — | — | 10 |
| NCO/OH | 0.7 | 1.0 | 0.8 | 1.0 | 1.0 | 0.6 | 1.0 | 0.8 | 0.7 | 0.7 | 1.0 | 1.0 | 0.6 |

TABLE 6

| Coated Film Characteristics | Ex. 7 | Ex. 8 | Ex. 9 | Ex. 10 | Ex. 11 | Ex. 12 | Com. Ex. 7 | Com. Ex. 8 | Com. Ex. 9 | Com. Ex. 10 | Com. Ex. 11 | Com. Ex. 12 | Com. Ex. 13 |
|---|---|---|---|---|---|---|---|---|---|---|---|---|---|
| Contact Angle (°) | 65 | 62 | 61 | 64 | 71 | 68 | 83 | 78 | 75 | 78 | 88 | 68 | 78 |
| Color Diff. (ΔE) | 4.1 | 3.9 | 4.4 | 4.0 | 3.7 | 4.3 | 7.6 | 7.2 | 5.5 | 5.8 | 8.6 | 4.9 | 6.9 |
| Short Term Stain Resistance | B | A | A | A | B | A | C | D | C | D2 | D | B | C |
| Long Term Stain Resistance | A | A | A | B | B | A | D | C | B | C | C | D | D |
| Weatherability (%) | 89 | 91 | 92 | 93 | 91 | 90 | 89 | 86 | 89 | 68 | 92 | 83 | 72 |
| Bending Test | A | A | A | A | A | A | A | A | 40° | 50° | A | 45° | A |

What is claimed is:

1. A fluorine-containing coating composition comprising:
   100 parts by weight of a fluorine-containing copolymer having a hydroxyl value of 80–200 mg KOM per 1 g thereof, said fluorine-containing copolymer being prepared by copolymerizing 40–65 mol % of a fluoroolefin, 14–50 mol % of a copolymerizable vinyl-containing compound, 12–25 mol % of a polymerizable hydroxyl-containing containing compound containing a hydroxyl group and 0.1–12 mol % of at least one other copolymerizable compound selected from the group consisting of carboxyl-containing compounds each containing a carboxyl group and vinyl alkoxysilanes each containing an alkoxyl group, said copolymerizable vinyl-containing compound being free from any one of said hydroxyl group, said carboxyl group and said alkoxyl group;
   0.1–20 parts by weight of an alkyl silicate; and
   0.05–3 parts by weight of a water-soluble polyether-modified silicone oil having in the molecule at least one dimethylsiloxane structural unit and at least one ethylene oxide structural unit.

2. A composition according to claim 1, wherein said polymerizable hydroxyl-containing compound comprises a glycerol monoallyl ether having in the molecule a secondary hydroxyl bonded to a secondary carbon atom, and wherein said fluorine-containing copolymer has another hydroxyl value caused by only said secondary hydroxyl, within a range from 1 to 60 mg KOH per 1 g of said fluorine-containing copolymer.

3. A composition according to claim 1, wherein said least one other copolymerizable compound comprises a carboxyl-containing compound amounting to 0.13–3 mol %.

4. A paint comprising the fluorine-containing coating composition according to claim 1, a hardener, and a solvent.

5. A composition according to claim 1, wherein said at east one other copolymerizable compound comprises a vinylalkoxysilane.

6. A composition according to claim 1, wherein said copolymerizable vinyl-containing compound comprises one selected from the group consisting of copolymerizable vinyl esters, copolymerizable vinyl ethers, and copolymerizable allyl ethers.

7. A composition according to claim 1, wherein said polymerizable hydroxyl-containing compound comprises one selected from the group consisting of hydroxyl-containing allylathers, hydroxyl-containing vinyl ethers and crotonic-acid modified compounds.

8. A composition according to claim 1, wherein said fluorine-containing copolymer has a number average molecular weight within a range from 1,000 to 30,000.

9. A composition according to claim 1, wherein said alkyl silicate comprises a tetraalkoxysilane or its condensate which is represented by the general formula (1):

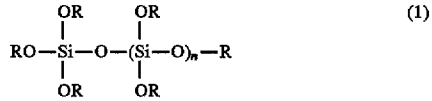

(1)

where R represents an alkyl group having a carbon atom number from 1 to 8, and n is an integer from 0 to 11.

10. A composition according to claim 1, wherein said silicone oil is represented by the following general formula (2):

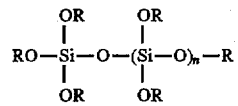  (1)

where R represents an alkyl group having a carbon number from 1 to 8, and n is an integer from 0 to 11.

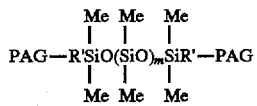  (2)

where PAG represents at least one polyalkylene oxide chain having at east one ethylene oxide structural unit, R' represents an alkylene group, Me represents a methyl. group, and m is an integer.

11. A fluorine-containing coating composition comprising:

100 parts by weight of a fluorine-containing copolymer having a hydroxyl value of 80–200 mg KOH per 1 g thereof, said fluorine-containing copolymer being prepared by copolymerizing 40–65 mol % of a fluoroolefin, 14–50 mol % of a copolymerizable vinyl-containing compound, 12–25 mol % of a polymerizable hydroxyl-containing compound containing a hydroxyl group, and 0.1–12 mol % of at least one other copolymerizable compound selected from the group consisting of carboxyl-containing compounds each containing a carboxyl group and vinyl alkoxysilanes each containing an alkoxyl group, said copolymerizable vinyl-containing compound being free from any one of said hydroxyl group, said carboxyl group and said alkoxyl group;

0.1–20 parts by weight of an alkyl silicate; and

1–25 parts by weight of a polyoxytetramethylene glycol having a number average molecular weight of 16–4,000.

12. A composition according to claim 11, wherein said polymerizable hydroxyl-containing compound comprises a glycerol monoallyl ether having in the molecule a secondary hydroxyl bonded to a secondary carbon atom, and wherein said fluorine-containing copolymer has another hydroxyl value caused by only said secondary hydroxyl, within a range from 1 to 60 mg KOH per 1 g of said fluorine-containing copolymer.

13. A composition according to claim 11, wherein said at least one other copolymerizable compound comprises a carboxyl-containing compound amounting to 0.1–3 mol %.

14. A paint comprising the fluoride-containing coating composition according to claim 11, a hardener, and a solvent.

15. A composition according to claim 11, wherein said at least one other copolymerizable compound comprises a vinylalkoxysilane.

16. A composition according to claim 11, wherein said copolymerizable vinyl-containing compound comprises one selected from the group consisting of copolymerizable vinyl esters, copolymerizable vinyl ethers, and copolymerizable allyl ethers.

17. A composition according to claim 11, wherein said polymerizable hydroxyl-containing compound comprises one selected from the group consisting of hydroxyl-containing allylethers, hydroxyl-containing vinyl ethers and crotonic-acid modified compounds.

18. A composition according to claim 11, wherein said fluorine-containing copolymer has a number average molecular weight within a range from 1,000 to 30,000.

19. A composition according to claim 11, wherein said alkyl silicate comprises a tetraalkoxysilane or its condensate which is represented by the general formula (1):

20. A fluorine-containing coating composition comprising:

100 parts by weight of a fluorine-containing copolymer having a hydroxyl value of 80–200 mg KOH per 1g thereof, said fluorine-containing copolymer being prepared by copolymerizing 40–65 mol % of a fluoroolefin, 14–50 mol % of a copolymerizable vinyl-containing compound, 12–25 mol % of a polymerizable hydroxyl-containing compound containing a hydroxyl group, and 0.1–12 mol % of at least one other copolymerizable compound selected from the group consisting of carboxyl-containing compounds each containing a carboxyl group and vinyl alkoxysilanes each containing an alkoxyl group, said copolymerizable vinyl-containing compound being free from any one of said hydroxyl group, said carboxyl group and said alkoxyl group;

0.1–20 parts by weight of an alkyl silicate;

0.05–3 parts by weight of a water-soluble polyether-modified silicone oil having in the molecule at least one dimethylsiloxane structural unit and at least one ethylene oxide structural unit; and 1–25 parts by weight of a polyoxytetramethylene glycol having a number average molecular weight of 16–4,000.

21. A composition according to claim 20, wherein said polymerizable hydroxyl-containing compound comprises a glycerol monoallyl ether having in the molecule a secondary hydroxyl bonded to a secondary carbon atom, and wherein said fluorine-containing copolymer has another hydroxyl value caused by only said secondary hydroxyl, within a range from 1 to 60 mg KOH per 1 g of said fluorine-containing copolymer.

22. A composition according to claim 20, wherein said at least one other copolymerizable compound comprises a carboxyl-containing compound amounting to 0.1–3 mol %.

23. A pain comprising the fluorine-containing coating composition according to claim 20, a hardener, and a solvent.

24. A composition according to claim 20, wherein said at least one other copolymerizable compound comprises a vinylalkoxysilane.

25. A composition according to claim 20, wherein said copolymerizable vinyl-containing compound comprises one selected from the group consisting of copolymerizable vinyl esters, copolymerizable vinyl ethers, and copolymerizable allyl ethers.

26. A composition according to claim 20, wherein said polymerizable hydroxyl-containing compound comprises one selected from the group consisting of hydroxyl-containing allylethers, hydroxyl-containing vinyl ethers and crotonic-acid modified compounds.

27. A composition according to claim 20, wherein said fluorine-containing copolymer has a number average molecular weight within a range from 1,000 to 30,000.

28. A composition according to claim 20, wherein said alkyl silicate comprises a tetraalkoxysilane or its condensate which is represented by the general formula (1):

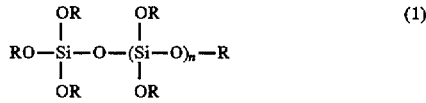

(1)

where R represents an alkyl group having a carbon atom number from 1 to 8, and n is an integer from 0 to 11.

29. A composition according to claim 20, wherein said silicone oil is represented by the following general formula (2):

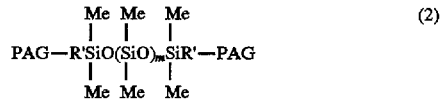

(2)

where PAG represents at least one polyalkylene oxide chain having at lest one ethylene oxide structural unit, R' represents an alkylene group, Me represents a methyl group, and m is an integer.

* * * * *